(12) United States Patent
Yamashita

(10) Patent No.: US 7,545,707 B2
(45) Date of Patent: Jun. 9, 2009

(54) OPTICAL DISC DRIVE

(75) Inventor: Tomonori Yamashita, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 564 days.

(21) Appl. No.: 11/432,725

(22) Filed: May 11, 2006

(65) Prior Publication Data

US 2006/0262670 A1    Nov. 23, 2006

Related U.S. Application Data

(63) Continuation of application No. PCT/JP03/14399, filed on Nov. 12, 2003.

(51) Int. Cl.
*G11B 7/00* (2006.01)
(52) U.S. Cl. ............... 369/30.15; 369/30.17; 369/44.28
(58) Field of Classification Search ........................ None
See application file for complete search history.

(56) References Cited

U.S. PATENT DOCUMENTS

| 5,317,550 | A | | 5/1994 | Semba | |
|---|---|---|---|---|---|
| 5,805,540 | A | * | 9/1998 | Kitai et al. | 369/44.28 |
| 5,870,356 | A | * | 2/1999 | Ikeda | 369/30.15 |
| 6,762,981 | B2 | * | 7/2004 | Ono | 369/44.28 |

FOREIGN PATENT DOCUMENTS

| JP | 5-307755 | 11/1993 |
|---|---|---|
| JP | 6-044596 | 2/1994 |
| JP | 8-147718 | 6/1996 |
| JP | 9-223317 | 8/1997 |

\* cited by examiner

*Primary Examiner*—Wayne R Young
*Assistant Examiner*—Van N Chow
(74) *Attorney, Agent, or Firm*—Greer, Burns & Crain, Ltd.

(57) ABSTRACT

The present invention relates to optical disc drives including a carriage which is movable radially of an optical disc and an objective lens which is supported on the carriage movably in radial directions of the disc for formation and placement of a beam spot on the disc. The invention aims at reducing minute vibration of the objective lens during a seek control stably and reliably. According to the present invention, the minute vibration of an objective lens (104) is reduced by moving the objective lens (104) at a relative speed of zero with respect to a carriage (101) during the seek operation, based on a TZC signal which indicates that the beam spot has crossed over a track in an optical disc (2). In this control, a position of the objective lens (104) in the carriage (101) right before starting the seek operation is detected and stored in a memory (802). Then, a position of the objective lens (53) in the carriage (101) is detected during the seek operation. If an error between this position and the position stored in the memory (802) exceeds a predetermined threshold value, the position of the objective lens (104) in the carriage (101) is corrected to the position stored in the memory (802).

5 Claims, 16 Drawing Sheets

OPTICAL DISC DRIVE

This is Continuation of International Patent Application No. PCT/JP2003/014399 filed Nov. 12, 2003.

TECHNICAL FIELD

The present invention relates to optical disc drives such as MO drives, and in particular to a technique in seek control for an optical head.

BACKGROUND ART

Optical disc drives employ a laser beam emitted from a semiconductor laser in a manner such that the laser beam is condensed by objective lenses into a small spot of beam (hereinafter called beam spot) focused on a disc surface for writing or reading information to/from the disc surface. In a magneto-optical disc for example, the disc surface is formed with a spiral guide channel ("groove") for guiding the beam spot, and information is recorded in a ridge ("land") which is the region sandwiched by the grooves. The land represents the information recording track, and one lap of the track is divided into a plurality of sectors (the unit of information recording).

Therefore, in information recording and reproducing to and from the tracks formed on the disc surface, beam spot access control is performed to move the beam spot onto a desired track, to read address information in each sector on the track, and to position the beam spot at a place (sector position) where desired information is to be recorded or replayed.

With the above principle in the optical disc drives, in order to move the beam spot radially of the disc thereby bringing the spot on the target track selected from a plurality of tracks (this operation is called "seek operation" below) as quickly as possible, the following arrangements are made. Specifically, the optical elements for generating the beam spot (the semiconductor laser, the objective lenses, a tracking signal detection system, a focus signal detection system, and so on) are mounted on an optical head, which is commonly made movable radially of the disc. Further, optical elements, such as the objective lens, which provide beam spot control in the directions of the optical axis are made finely movable radially of the disc, independently on the optical head. With these arrangements, the seek control is performed by doing two kinds of seek operations; a seek operation in which the entire optical head is moved radially of the disc over a long span to bring the beam spot close to the target track (rough seek operation), and another seek operation in which only the beam spot is moved radially of the disc minutely by the objective lens to bring the beam spot accurately on the target track (precise seek operation).

An optical head which is used for the seek control as the above includes an actuator for moving the entire optical head radially of the disc (hereinafter called carriage actuator) and an actuator for moving the objective lens slightly to move only the beam spot radially of the disc (hereinafter called lens actuator).

FIG. 15 shows a basic actuator configuration of an optical head which includes a carriage actuator and a lens actuator.

An optical head 10 includes a carriage 101, a carriage actuator 102 which moves the carriage 101 radially of the disc, an objective lens 104 supported by four springs 103 on the carriage 101, and a lens actuator 105 which moves the objective lens 104 radially of the disc independently. It should be noted that the figure does not show optical systems mounted on the carriage 101, e.g. a focus detection system, a tracking signal detection system, and so on.

The carriage actuator 102 includes a motor 106 which is a power source for the carriage 101 and is provided by e.g. a stepping motor, and a transmission member 107 which transforms the rotary power of the motor 106 into a linear motion power and transmits the power to the carriage 101. The transmission member 107 includes a shaft 107a which is connected with a rotor of the motor 106 and has a circumference formed with a male thread, and a first support 101a which extends out of a side surface of the carriage 101 (the upper side surface as in FIG. 15) and has an end formed with a female thread mated by the shaft 107a. In addition, the other side surface of the carriage 101 (the lower side surface as in FIG. 15) is provided with a second support 101b which extends out of the surface. The second support 101b has a through hole fitted by a guide rod 108 which runs parallel to the shaft 107a. It should be noted that the shaft 107a and the guide rod 108 are parallel to a radius of the disc.

Therefore, when the motor 106 is turned, the motor's rotating power is transformed to a linear motion power and transmitted to the first support 101a by the transmission member 107, causing the carriage 101 guided by the guide rod 108 to move radially of the disc, thereby moving the beam spot radially of the disc over a large distance (rough seek operation).

On the other hand, the lens actuator 105 includes a pair of magnets 105a, 105b provided on two side surfaces of a housing for the objective lens 104, and a pair of electric magnets 105c, 105d opposed respectively to the magnets 105a, 105b. The magnets 105a, 105b and the electric magnets 105c, 105d are placed in line, in parallel to the guide rod 108 (i.e. in parallel to a radius of the disc).

When no electricity is applied to coils of the electric magnets 105b, 105b, the objective lens 104 which is supported by the springs 103 is at a neutral point M (hereinafter the neutral point M is called reference position M). When electricity is applied to the coil of the electric magnet 105c or of the electric magnet 105d, the attracting force from the electric magnet 105c or the electric magnets 105d dislocates the object lens from the reference position M. The amount of dislocation is dependent on the amount of electricity applied to the relevant electric magnet 105c or electric magnet 105d.

Therefore, by controlling the amount and the direction of electric power applied to the electric magnet 105c or the electric magnet 105d, the objective lens 104 is moved on the carriage 101, independently from the carriage 101 and radially of the disc, whereby the beam spot is moved radially of the disc by a minute distance (precise seek operation).

Now, there is a problem in this two-step seek control in which the carriage 101 is moved for a macro seeking and then the objective lens 104 is moved for a micro seeking. Specifically, due to the supporting structure that the objective lens 104 is supported by the carriage 101 via the springs 103, vibration occurs in the objective lens 104 when the macro-scale seek operation by the movement of carriage 101 is followed by the micro-scale seek operation by the movement of objective lens 104 as the carriage 101 accelerates or decelerates quickly, and it is impossible to start the seek operation by the objective lens 104 until the vibration ceases.

In an attempt to solve this problem, a number of seek operation methods have been proposed.

For example, JP-A-H09-223317 discloses a method in which a carriage travel distance is calculated on the basis of control signal sent to a carriage drive, a beam spot radial travel distance is calculated based on the number of crossings over disc tracks made by the beam spot, and the objective lens actuator is controlled so that the carriage travel distance and the beam spot travel distance are equal to each other.

According to this seek control method, it is stated that the carriage travel distance is the travel distance radially of the disc, so when the carriage travel distance is maintained equal to the beam spot travel distance radially of the disc in the seek operation, the carriage and the objective lens travel virtually at the same speed, without causing vibration in the objective lens, and so it is possible to improve efficiency in the seek control in which a rough seek operation by moving the carriage is used in combination with a precise seek operation by moving the objective lens.

JP-A-H08-147718 discloses a different method: The traveling speed of an optical head (the carriage) is detected at the time of seek operation, and the objective lens traveling speed is detected from a tracking error signal which is a control signal for automatically adjusting the beam spot hitting position on the track. Further, a relative speed of the objective lens to the optical head is calculated from the difference between the optical head traveling speed and the objective lens traveling speed, and the vibration of the objective lens is controlled on the basis of this relative speed.

In this seek control method, the carriage and the objective lens traveling speeds are used as parameters, and the seek control is made to zero the relative speed of the objective lenses to the carriage so there will not be vibration generated in the objective lens. This method and the method disclosed in JP-A 9-223317 Gazette are based on the same strategy that relative movement of the objective lens with respect to the carriage is controlled in order to reduce the vibration generated in the objective lens.

In the above, the beam-spot disc-radial traveling speed VA is obtained as follows: Tracking error signal (hereinafter called TES signal) has a sine-wave pattern as shown in FIG. 16(a) By comparing the TES signal to the zero-level signal (i.e. an average value of the positive-side peak value and the negative-side peak value as in FIG. 16(a)), a square-wave representation or square-wave tracking zero-cross signal (hereinafter called TZC signal) is made as shown in FIG. 16(b). Calculations are made to obtain a trailing edge time period or a rising edge time period TA of the TZC signal. The speed VA is obtained by dividing the track pitch XA (the pitch between the lands; see FIG. 17) by the time period TA.

There is a problem in this calculation method which uses the TZC signal in order to obtain the beam spot traveling speed VA. Specifically, when the beam spot has crossed a place where the groove and the land do not alternate each other, the TES signal will not make a sin wave form, and the beam-spot track-passing time TA calculated from the TZC signal is different from a correct value and therefore, the beam spot traveling speed VA is not accurate.

More specifically, the track on the magneto-optical disc is divided into a plurality of sectors, and each sector has a forefront portion which contains sector ID information including a track number, a sector number and so on. As shown in FIG. 17, the region in the land where the ID information is formed (pits) is pitted, i.e. formed with recesses. The height of the place where the ID information is formed is more or less the same as the height of two grooves which sandwich the land. For this reason, when the beam pitch crosses the region where the ID information is formed as indicated by Arrow Q, the waveforms of the TES signal and the TZC signal will be as shown in FIG. 18. Specifically, the number of track crossing is counted one time less. The beam-spot track-passing time TA then is longer than the correct value, which means that the calculated traveling speed VA is slower than the correct value.

When such a situation as the above takes place in the seek control where, for example, the relative speed of the objective lens with respect to the carriage has to be zero, it becomes impossible to control the relative speed accurately to zero during the seek operation, and it becomes unable to suppress the objective lens vibration stably or reliably during the seek control.

DISCLOSURE OF THE INVENTION

The present invention has been proposed under the above-described circumstances, and it is therefore an object of the present invention to provide an optical disc drive capable of automatically correcting an error in the objective lens traveling speed which is calculated by using the TZC signal, thereby suppressing the objective lens vibration stably and reliably during the seek control.

The present invention provides an optical disc drive including: a carriage faced to a surface of an optical disc movably in radial directions of the disc; a first actuator for driving the carriage; a light source for generating a laser beam; an objective lens supported on the carriage movably in radial directions of the disc for formation and placement of a beam spot formed from the laser beam generated by the light source onto the optical disc for recording or reproducing information on a plurality of centric or spiral tracks in the optical disc; a second actuator for moving the objective lens; a first signal generator for generating, when the beam spot has crossed over the track in the optical disc, a first signal based on a reflected beam from the optical disc and having a sine-wave amplitude pattern representing the crossing movement of the beam spot over the track; a second signal generator for generating a second signal based on an amplitude change of the first signal generated by the first signal generator, as a square wave signal reversing its level upon each crossing movement of the beam spot over the track; a first speed calculator for calculating a traveling speed of the carriage during a seek operation by the carriage; a second speed calculator for calculating a traveling speed of the objective lens based on the second signal during the seek operation by the carriage; a controller for controlling the second actuator for a movement of the objective lens at a relative traveling speed of zero with respect to the carriage, based on the traveling speed of the carriage and the traveling speed of the objective lens calculated by the first and the second speed calculator. The optical disc drive further comprises: a first position detector for detecting position information of the objective lens in the carriage right before starting of the seek operation by the carriage; a memory for storing the position information of the objective lens detected by the first position detector; a second position detector for detecting position information of the objective lens in the carriage at a predetermined time interval during the seek operation by the carriage; and a position corrector for comparing the position information detected by the second position detector to the position information stored in the memory, and for correcting a position of the objective lens in the carriage to a position indicated by the information stored in the memory if an error between the two pieces of position information exceeds a predetermined threshold value.

Preferably, in the above optical disc drive, an amount of movement of the objective lens is proportional to an amount of electric current consumed by the second actuator, and the first and the second position detector detect their respective position information of the objective lens in the carriage based on the amount of electric current consumed by the second actuator.

Further, it is preferred that the optical disc drive further includes: a determiner for determining if the position of the objective lens in the carriage detected by the first position detector is a reference position which indicates a zero amount of movement; and a seek controller for starting a seek operation for the beam spot by moving only the objective lens using the second actuator if the determiner has determined that the objective lens is not at the reference position, and starting the seek operation by the carriage once the objective lens has come to the reference position.

Further, it is preferred that the optical disc drive further includes: a third speed calculator for calculating a traveling speed of the objective lens when the objective lens has come to the reference position during the seek operation by the objective lens; and a speed determiner for determining on whether or not the traveling speed of the objective lens calculated by the third speed calculator exceeds a predetermined threshold. With this arrangement, the seek controller continues the seek operation by moving only the objective lens until the traveling speed of the objective lens calculated by the third speed calculator has attained the predetermined threshold if the traveling speed of the objective lens determined by the speed determiner is lower than the predetermined threshold.

BRIEF DESCRIPTION OF THE DRAWINGS

FIG. 8 illustrates a positional relationship of an objective lens with respect to a carriage before and after a seek operation.

BEST MODE FOR CARRYING OUT THE INVENTION

Preferred embodiments of the present invention will be described below with reference to the attached drawings.

Figure 1:
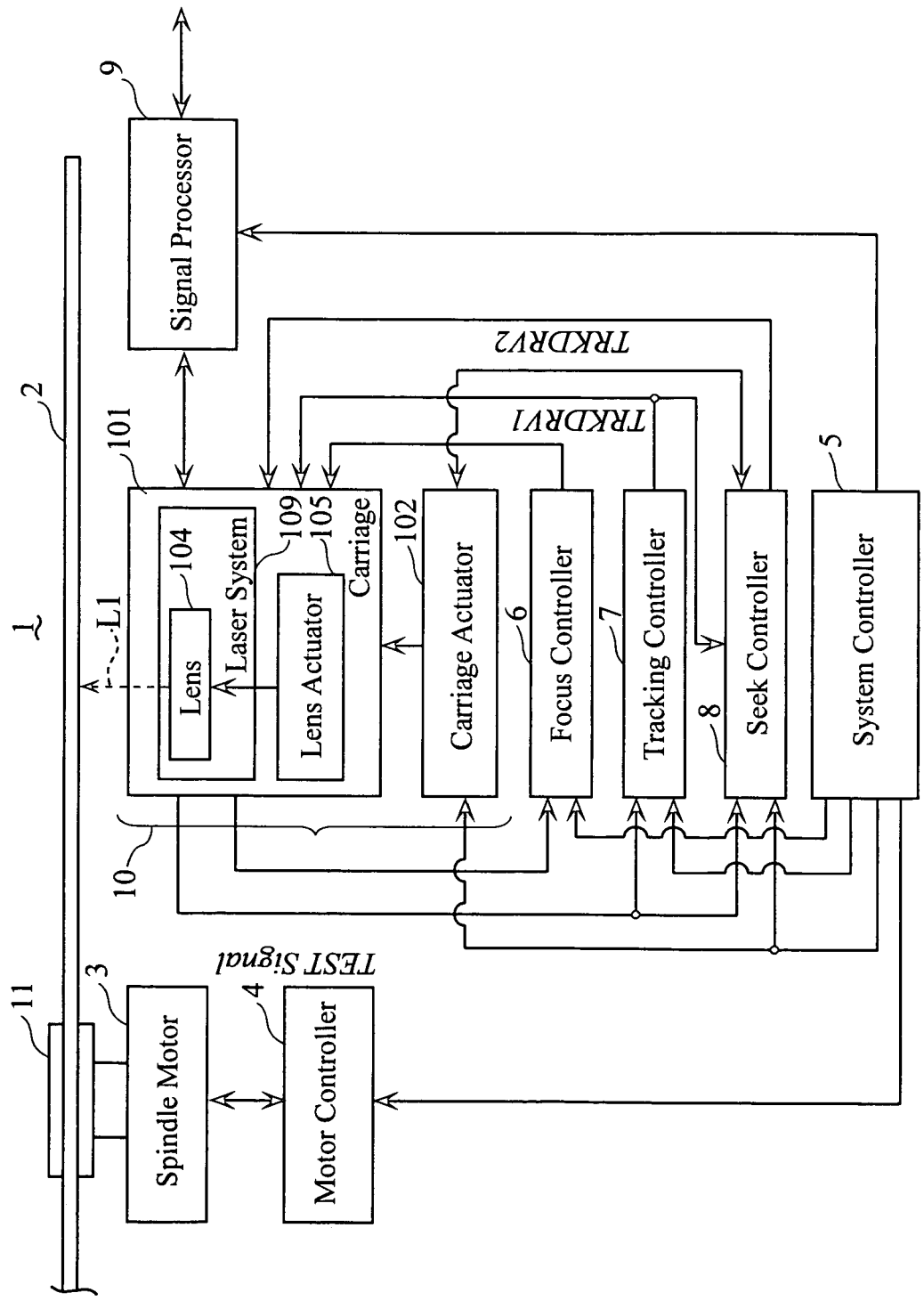
FIG. 1 is a block diagram of a primary portion concerning a seek control in an optical disc drive according to the present invention.

FIG. 1 is a block diagram of a primary portion concerning a seek control in an optical disc drives according to the present invention.

An optical disc drive 1 includes the following elements which are related to the seek control: a spindle motor 3 which turns an optical disc 2; a spindle motor controller 4 which controls turning of the spindle motor 3; an optical head 10 which forms a beam spot from a laser beam L onto the optical disc 2 for reading/writing data; a carriage actuator 102 which moves a carriage 101 as part of the optical head 10 radially of the optical disc 2; a focus controller 6 which controls the focus of the beam spot applied from the optical head 10 to the optical disc 2; a tracking controller 7 which provides control on the location hit by the beam spot so that the beam spot thrown from the optical head 10 to the optical disc 2 will stay on the track of the optical disc 2 while the optical disc 2 is turning; a seek controller 8 which provides control on the travel of beam spot radially of the optical disc 2 when the beam spot is moved onto a specified track of the optical disc 2 for recording or reproducing data; a signal processor 9 which performs a predetermined signal processing on signals coming in and out of the optical head 10 at times of recording/reproducing to and from the optical disc 2; a spindle motor controller 4; and a system controller 5 which controls the focus controller 6 through the signal processor 9.

It should be noted that the spindle motor controller 4 and a group of components consisting of the system controller 5 through the focus controller 9 are primarily provided by software, and realized through execution of the software by a relevant MPU provided for each element.

The spindle motor 3 is provided by e.g. a brushless DC motor, and is placed to support the center hole of the optical disc 2. By driving the spindle motor 3 at a predetermined rpm in a predetermined direction (clockwise when the optical disc 2 is viewed from above), the optical disc 2 is turned at a predetermined constant speed. The driving of the spindle motor 3 is controlled on the basis of a control signal from the spindle motor controller 4. For example, if the motor is a three-phase brushless DC motor, the spindle motor controller 4 will send a 120-degree-drive square-wave signal (control signal) to the spindle motor 3.

The driving control of the spindle motor 3 is performed by the system controller 5. The system controller 5 provides the spindle motor controller 4 with timing signals for starting and stopping the turning of spindle motor 3. The spindle motor controller 4 controls driving/stopping of the spindle motor 3 based on the timing signals.

Figures 15, 16:
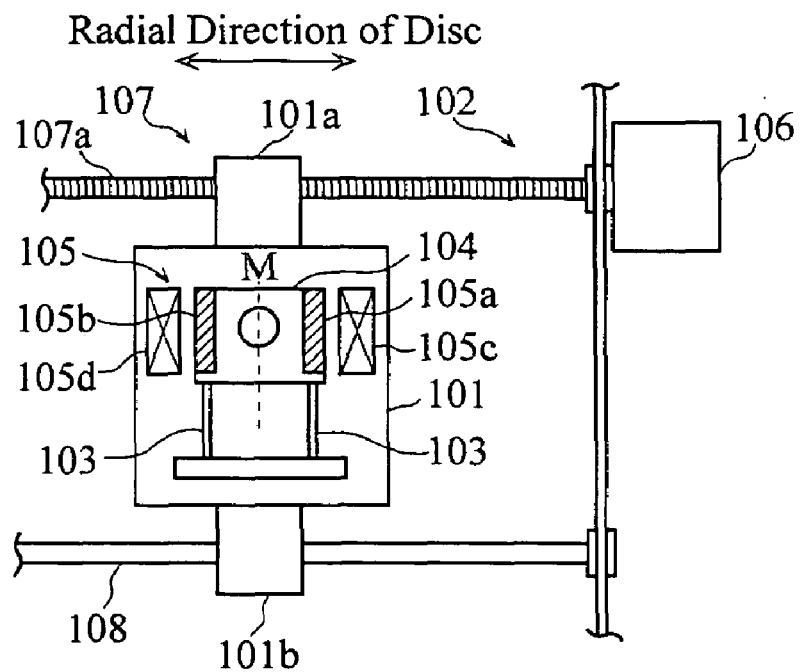
FIG. 15 shows a basic actuator configuration for an optical head which is provided with a carriage actuator and a lens actuator.
FIG. 16 shows waveforms of a TES signal and a TZC signal.

The optical head 10 has the same configuration as the one in FIG. 15 which is provided with a carriage actuator and a lens actuator. In addition, the carriage actuator 102, the objective lens 104 and the lens actuator 105 in FIG. 1 are also the same as in FIG. 15, so the detailed description will not be repeated here.

As shown in FIG. 15, the objective lens 104 is supported by four springs 103 on the carriage 101. The lens actuator 105 includes a pair of magnets 105a, 105b provided on two side surfaces of a housing for the objective lens 104, and a pair of electric magnets 105c, 105d opposed respectively to the magnets 105a, 105b. With this construction, by controlling the amount of electricity applied to one of the electric magnets 105c, 105d, the objective lens 104 is dislocated radially of the optical disc 2 on the carriage 101, within a predetermined range.

A laser beam optical system 109 allows a laser beam L which is generated in an unillustrated laser generator to travel to the objective lens 104 so that the beam spot can hit the optical disc 2, as well as allowing a beam which is reflected by the optical disc 2 and enters the objective lens 104 to travel toward the signal processor 9. This optical system includes an optical system for detecting a signal necessary when adjusting the focus of beam spot thrown onto the optical disc 2 via the objective lens 104, and an optical system for detecting a signal necessary when adjusting the tracking of the beam spot.

The objective lens 104 condenses the laser beam L which has traveled through the laser beam optical system, to form a beam spot of a predetermined diameter (e.g. 1.6 μm approx.) on a surface of the optical disc 2 (the disc lower surface as in FIG. 1). As has been described earlier, the objective lens 104 can be moved radially of the optical disc 2 by the lens actuator 105, on the carriage 101 and independently of the carriage 101. In other words, it is possible to move the beam spot on the optical disc 2 independently of the carriage 101 and radially of the optical disc 2 (track crossing direction) by moving the objective lens 104.

The carriage 101 is assembled to the carriage actuator 102 using the same structure as shown in FIG. 15, and so can be moved radially of the optical disc 2 by rotation of a motor 106 which is a stepping motor for the carriage actuator 102. Since the present embodiment makes use of a stepping motor to drive the carriage 101, the pulse signal (drive pulse) for controlling the driving of the stepping motor is utilized for detection of the traveling speed V of the carriage 101 during seek operation.

Specifically, with the stepping motor's stepping angle being represented by D(°), and the linear travel distance of the carriage 101 on the shaft 107a per rotation of the motor being represented by P (mm), the per-pulse traveling speed Vp (mm/pulse) of the carriage 101 is expressed as $Vp = P \times D / 360$. Therefore, with the stepping motor rotation control target value being represented by N (pulse/second (pps)), the traveling speed V (mm/second) of the carriage 101 is expressed as $Vp \times N$. In other words, the traveling speed V of the carriage 101 can be calculated once the stepping motor rotation control target value N is given.

It should be noted here that seek operation control by moving the carriage 101 is performed by the seek controller 8. The seek controller 8 outputs the stepping motor rotation control target value N to the carriage actuator 102, so the traveling speed V of the carriage 101 during the seek operation is calculated by the seek controller 8.

Figure 17:
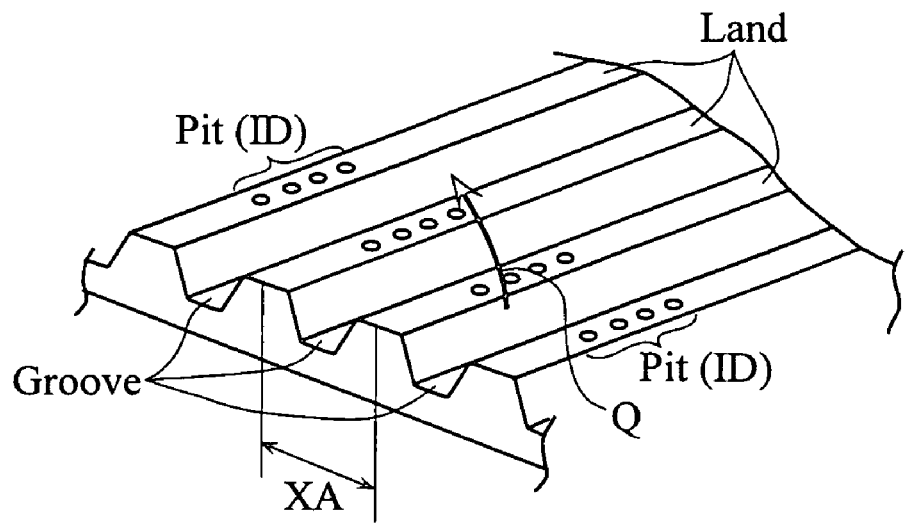
FIG. 17 is a perspective view of a primary portion, showing a relationship between lands, grooves and ID information recording positions formed in a magneto-optical disc.

The focus controller 6 provides automatic adjustment so that the beam spot which is thrown onto the optical disc 2 via the objective lens 104 will focus on the track of the optical disc 2. The optical disc 2 in rotation makes slight, vertical vibration. Thus, the beam spot which is thrown onto the track by the optical head 10 comes out of the focus due to the vibration. The laser beam optical system in the optical head 10 includes a circuit (focus signal detection circuit) which detects a signal that represents a positional displacement of the beam spot focus based on the beam reflected by the optical disc 2. The focus controller 6 makes use of this signal outputted from the focus signal detection circuit, and controls a focus adjusting optical system within the laser beam optical system, thereby automatically bringing the beam spot focal point onto the track of the optical disc 2 (onto the land in the case of magneto-optical disc in FIG. 17).

The tracking controller 7 provides automatic fine adjustment of the position on the optical disc 2 where the beam spot is thrown, so that the relative travel of the beam spot while the optical disc 2 rotates will be made right on the specified track. The optical disc 2 is eccentric. Therefore, even if the tracks on the optical disc 2 are formed concentrically, the track will run slightly out of the true concentric path of the optical disc 2 as the optical disc 2 rotates, deflecting slightly to the right and left directions. The same problem exists in a track which is formed in a spiral shape.

The laser beam optical system in the optical head 10 includes a circuit (tracking error signal detection circuit) which detects a signal that represents a positional displacement of the beam spot out of the track position based on the beam reflected by the optical disc 2. The tracking controller 6 makes use of this TES signal outputted from the tracking error signal detection circuit, and controls the lens actuator 105 to adjust the position of the objective lens 104 in the carriage 101, thereby automatically bringing the beam spot onto the track position of the optical disc 2.

The seek controller 8 controls a quick beam-spot positioning operation (seek operation) in which the carriage 101 or the objective lens 104 is moved radially of the optical disc 2 thereby positioning the beam spot quickly onto a specified track position. The seek controller 8 controls the seek operation based on control signals from the system controller 5.

For example, when a WRITE command is sent from a computer which is connected with the optical disc drive 1, the system controller 5 sends to the seek controller 8 data that comes with the command as well as information about the recording region in the optical disc 2 where the data is to be written (i.e. information about the track number and sector number). Based on this information, the seek controller 8 moves the carriage 101 or the objective lens 104 radially of the optical disc 2 thereby bringing the beam spot onto the data writing position (the position specified with the track number and the sector number).

Figure 3:
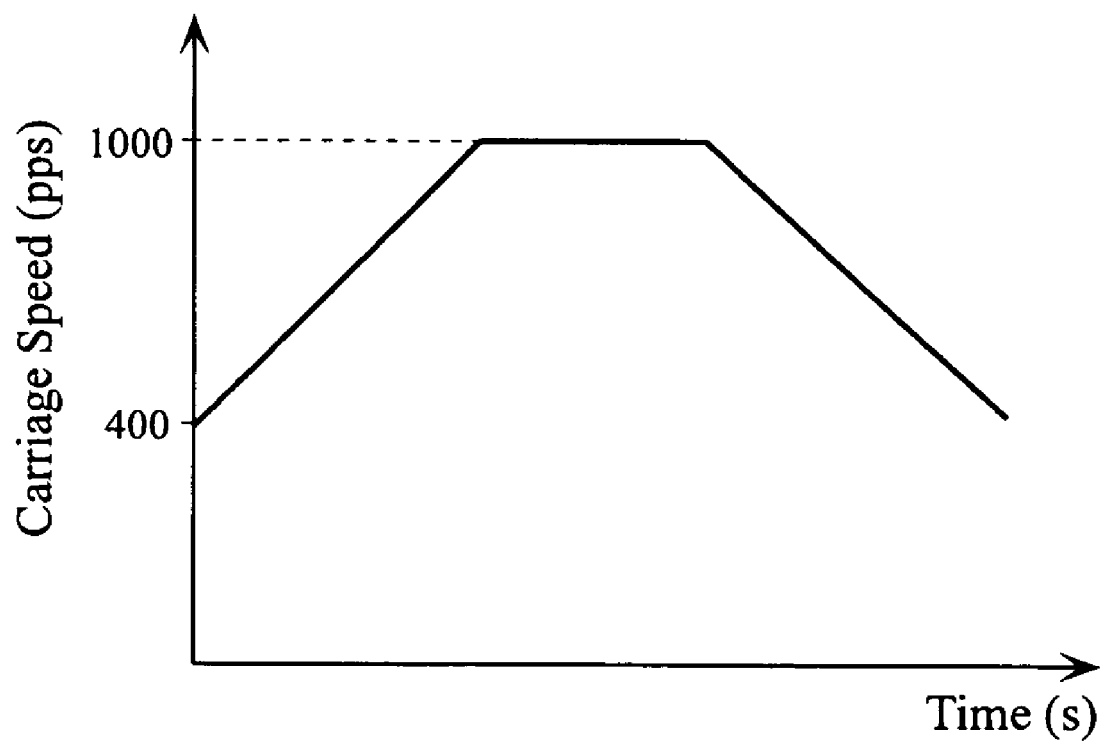
FIG. 3 shows a profile of a target speed of a carriage in a seek operation.

In the seek control, the seek controller 8 moves the carriage 101 essentially along a speed profile shown in FIG. 3. Specifically, the seek controller 8 starts the carriage 101 at a target speed of Vo=400 pps and with a predetermined acceleration, until the carriage 101 has attained a predetermined traveling speed V of 1000 pps, upon which a constant-speed movement is maintained for a predetermined period of time. Thereafter, the traveling speed V of the carriage 101 is decelerated at about the same rate as was in the acceleration, bringing the beam spot near the specified track (rough seek operation). Thereafter, only the objective lens 104 is moved slightly to bring the beam spot on the specified track position (precise seek operation). It should be noted here that the speed profile is not limited to the example shown in FIG. 3.

As has been described earlier, the optical head 10 according to the present embodiment has a configuration bound to a fundamental problem; i.e. in a two-step seek control which is a rough seek operation followed by a precise seek operation, a minute vibration is generated in the objective lens 104 by the acceleration and deceleration while the carriage 101 travels, and it is not possible, upon finishing of the seek operation of the carriage 101, to give a slight travel to the objective lens 104 to bring the lens onto the specified track position (it is not possible to smoothly shift from the rough seek operation to the precise seek operation).

However, as will be described later, during the rough seek operation the seek controller 8 monitors positional change of the objective lens 104 in the carriage 101 for each rotation of the optical disc 2, and once the objective lens 104 has changed its position by a distance not smaller than a track interval (e.g. 1.6 μm) of the optical disc 2, the seek controller brings the objective lens 104 back to a position in the carriage 101 where it was at the beginning of the rough seek (hereinafter this position will be called initial position). By this operation, the objective lens 104 stays on a fixed position in the carriage 101, and vibration of the objective lens 104 is prevented as much.

The signal processor 9 includes a modulation circuit and a demodulation circuit. When writing data to the optical disc 2, the signal processor modulates the data from the computer in accordance with a predetermined modulation method, and outputs the modulated signal to the optical head 10. Based on the modulated signal, the optical head 10 generates pulse signal for data recording on the optical disc 2, and generates the laser beam L based on the pulse signal, throws the pulse beam onto the optical disc 2 and records the data. When reading data from the optical disc 2, the signal processor demodulates signal contained in the reflected beam from the optical disc 2 in accordance with a predetermined demodulation method, and outputs the demodulated signal to a next step or an unillustrated data replay circuit.

Next, description will cover the seek control according to the present invention.

Figure 2:
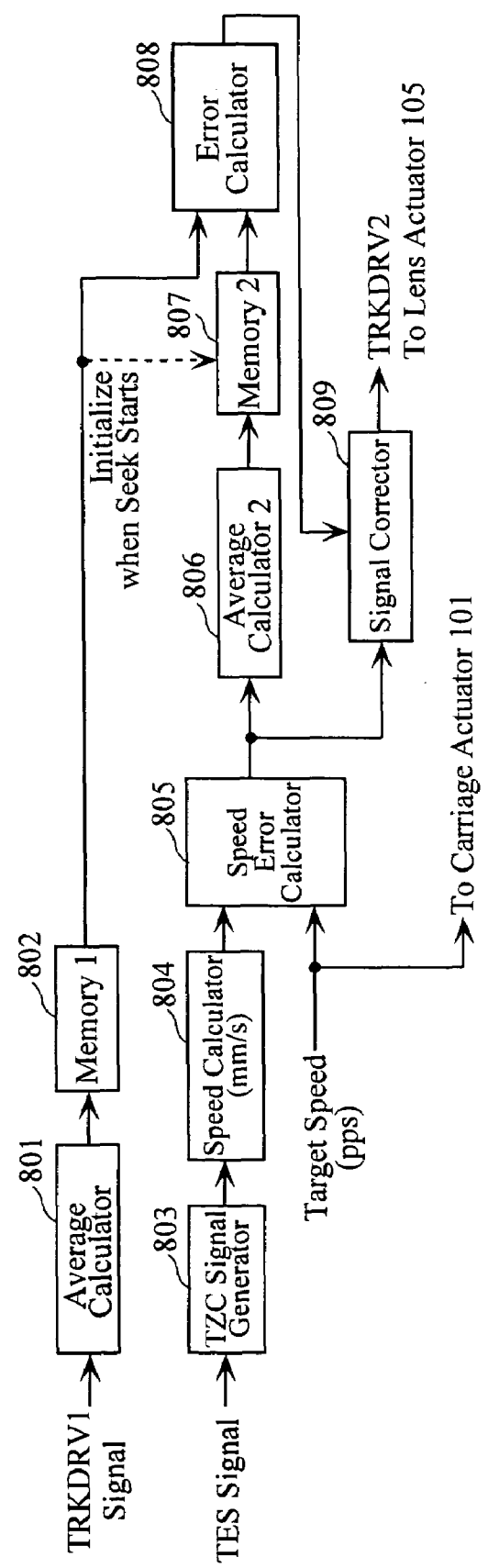
FIG. 2 is a block diagram showing a first embodiment of a seek operation control in a seek controller.

FIG. 2 is a block diagram showing a first embodiment of the seek operation control in the seek controller 8.

In this figure, an average-value calculator 801 is an element which calculates an average value per each turn of the optical disc 2, of a drive signal TRKDRV1 that is a signal outputted from the tracking controller 7 to the lens actuator 105 for tracking purpose.

The drive signal TRKDRV1 is a value of electric current applied to the electric magnets 105c, 105d in the lens actuator 105. When the value of electric current applied to the electric magnets 105c, 105d of the lens actuator 105 is zero, the objective lens 104 is at the reference position M as shown in FIG. 15, and in proportion to the amount of current applied, there is an increasing amount of dislocation of the objective lens 104 out of the reference position M. In other words, there is a predictable relationship between the amount of electric current applied to the lens actuator 105 and the position of the objective lens 104 in the carriage 101 (as measured from the reference position M).

Therefore, the position of the objective lens 104 in the carriage 101 can be detected from the drive signal TRKDRV1. As described earlier, however, due to eccentricity of the optical disc 2, the track position while the optical disc 2 is turning is deflected to the right and left from the truly concentric track position, and accordingly to the displacement, there is slight fluctuation in the drive signal TRKDRV1 which is the signal for the beam spot to follow the track. For this reason, the average-value calculator 801 calculates an average value of the drive signal TRKDRV1 per rotation of the optical disc 2 in order to cancel the influence from the minute vibration in the position calculation for the objective lens 104 in the carriage 101.

The average value of the drive signal TRKDRV1 calculated by the average-value calculator 801 (which represents position information of the objective lens 104 in the carriage 101) is stored in a memory 802, and the stored value is updated every rotation of the optical disc 2 by a new average value of the drive signal TRKDRV1. Therefore, when a seek operation is started at a given time point, the memory 802 has an average value of the drive signal TRKDRV1 right before the time point, which is position information of the objective lens 104 in the carriage 101 right before the seek operation was started.

A TZC signal generator 803 generates a TZC signal from a TES signal outputted from the optical head 10 during the seek operation. The TZC signal is generated from the TES signal in exactly the same method as already described with reference to FIG. 16, so detail will not be repeated here.

A speed calculator 804 calculates a traveling speed VA (mm/s) of the beam spot relative to the optical disc 2 during seek operation, using the TZC signal outputted from the TZC signal generator 803. With the track interval in the optical disc 2 being represented by XA(mm), the number of time the track is crossed per second being represented by K, and the time for crossing two mutually adjacent tracks being represented by TA(s) (See FIG. 16(b)), then they can be expressed as VA=K× XA(mm/s) and K=1/TA, and therefore VA=XA/TA.

The speed calculator 804 calculates a time TA from the TZC signal outputted from the TZC signal generator 803, then by using the time TA and a known track interval XA of the optical disc 2, calculates the beam spot traveling speed VA from the formula VA=XA/TA. Note that the travel of the beam spot is controlled by the objective lens 104, and therefore the beam spot traveling speed VA virtually represents the traveling speed of the objective lens 104 with respect to the optical disc 2.

A speed error calculator 805 calculates an error ΔV(mm/s) between a traveling speed target value Vo (mm/s) for the carriage 101 during seek operation control (which is virtually the carriage traveling speed V) inputted from the system controller 5 and the beam spot traveling speed VA (mm/s) calculated by the speed calculator 804. During the seek operation, the speed error ΔV is inputted to the lens actuator 105 as a drive signal TRKDRV2 in place of the drive signal TRKDRV1, via a signal corrector 809 (to be described later).

It should be noted here that the input from the system controller 5 provided as the traveling speed of the carriage 101 to be controlled during the seek operation is the stepping motor rotation control target value N (pps) of the carriage actuator 102. Thus, the speed error calculator 805 calculates the target speed Vo=N×Vp (m/s) from the rotation control target value N and the earlier-described per-pulse traveling speed Vp of the carriage 101, and subtracts the beam spot traveling speed VA from this target speed Vo to obtain the speed error ΔV=Vo−VA.

If the speed error ΔV is zero, the beam spot traveling speed VA relative to the optical disc 2 is equal to the traveling speed Vo (=V) of the carriage 101 relative to the optical disc 2. Therefore, the relative speed of the objective lens 104 to the carriage 101 is zero, which means that the objective lens 104 is stationary with respect to the carriage 101.

On the other hand, if the speed error ΔV is not zero, the relative speed of the objective lens 104 to the carriage 101 is not zero, which means that the objective lens 104 is moving with respect to the carriage 101, i.e. there is minute vibration in the objective lens 104.

Therefore, during the seek operation, the speed error ΔV or the drive signal TRKDRV2 is inputted to the lens actuator 105 in place of the drive signal TRKDRV1, and the objective lens 104 is moved slightly on the basis of the drive signal TRKDRV2 to control the minute vibration in the objective lens 104.

In the tracking control, assume that a seek operation has been started and the position of the objective lens 104 in the carriage 101 at this particular time point was +X (μm) with respect to the reference position M (the plus (+) sign indicates the direction toward the center hole of the optical disc 2).

During the seek operation thereafter, lens actuator 105 is provided with the speed error ΔV or drive signal TRKDRV2 calculated by the average-value calculator 806. If there is a minute vibration developed in the objective lens 104, which will cause the objective lens 104 out of the position +X in the carriage 101, then the position control will adjust the position of the objective lens 104 so as to zero out the speed error ΔV, i.e. so that the position of the objective lens 104 is stationary at the position +X.

Figure 18:
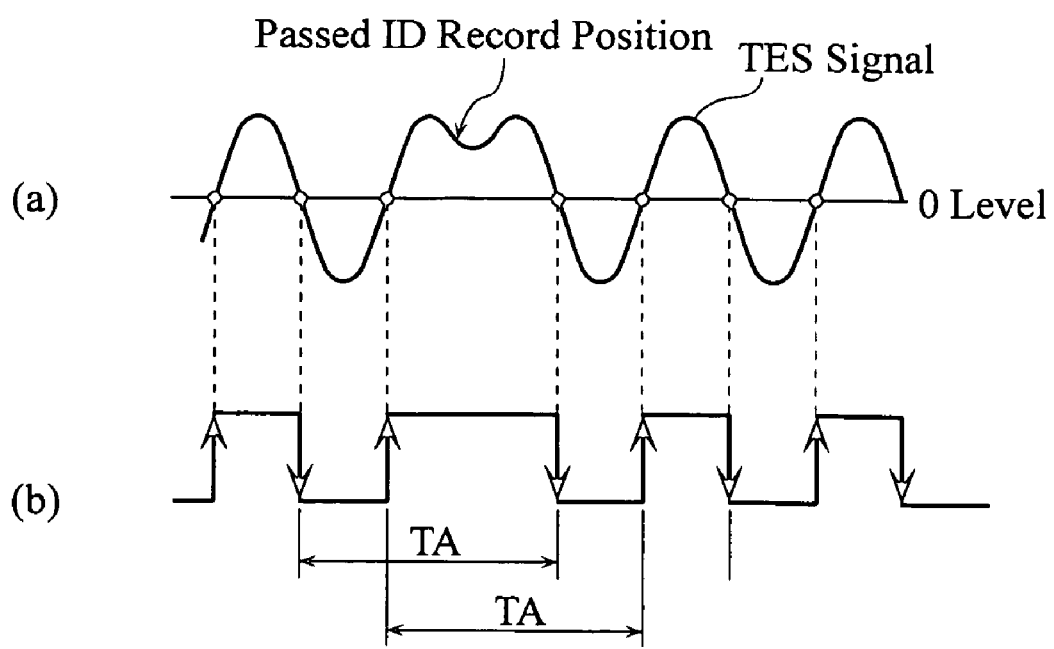
FIG. 18 shows waveforms of the TES signal and the TZC signal when an ID information recording position is scanned by a beam spot during a seek operation.

However, as described earlier with reference to FIG. 18, there can be a situation in which the TES signal contains a waveform which leads to non-detection of a track crossing. Then, this particular TES signal is utilized to generate a TZC signal, and a calculation is made to get a beam stop traveling speed during seek operation, but the obtained traveling speed VA is different from the actual traveling speed and as a result, the speed error ΔV is different from the actual speed error. Therefore, if the position control is made for the objective lens 104 based on this speed error ΔV during the seek operation, the position of the objective lens 104 will become further away from +X.

The average-value calculator 806 through the signal corrector 809 correct this improper control when the TES signal contains the non-detection waveform.

The average-value calculator 806 calculates an average value of the speed error ΔV outputted from the speed error calculator 805 per rotation of the optical disc 2. As has been described, when the speed error ΔV is not zero, there is vibration in the objective lens 104 during the seek operation, and the position of the objective lens 104 in the carriage 101 is changing. Since the speed error ΔV is calculated continuously at a predetermined time interval during the seek operation, the average-value calculator 806 calculates an average value of the speed error ΔV per rotation of the optical disc 2, and thereby calculates an average position of the objective lens 104 in the carriage 101 during a given rotation of the optical disc 2.

The average value of the speed error ΔV (position information of the objective lens 104 in the carriage 101) calculated by the average-value calculator 805 is stored in the memory 807, and the stored value is updated every rotation of the optical disc 2 by a new average value of the speed error ΔV. As a note however, when a seek is started, position information stored in the memory 802, of the objective lens 104 in the carriage 101 is stored as an initial value in the memory 807.

An error calculator 808 reads out position information of the objective lens 104 from the memory 802 and from the memory 807 for each rotation of the optical disc 2, calculates an error between the two values, and determines if the error exceeds a predetermined threshold (e.g. a distance equal to the track interval in the optical disc 2). For example, imagine that the memory 802 stores position information or a value +X as a position of the objective lens 104 in the carriage 101 at the time when a seek was started whereas the memory 807 stores position information or a value +X' as a current position of the objective lens 104 in the carriage 101. Then, the error calculator 808 calculates the error ΔX=|X'−X|, and determines if the error ΔX exceeds a predetermined threshold Xr (e.g. 1.6 μm).

If the error ΔX exceeds the threshold value Xr, the error calculator 808 determines that the TES signal includes a track-crossing non-detection error which will lead to improper control on the position of the objective lens 104 and thus, sends a correction signal of the drive signal TRKDRV2 to the signal corrector 809.

The signal corrector 809, which receives the correction signal from the error calculator 808, outputs to the lens actuator 105 a drive signal TRKDRV2' in substitution for the speed error ΔV inputted from the speed error calculator 805. This positions the objective lens 104 at the place where the objective lens was in the carriage 101 when the seek was started. In other words, the speed error ΔV is not reliable here, so the amount of positional displacement based on the speed error ΔV will not be used to bring the objective lens 104 back to the position where it was when the seek was started, but the adjustment is made on the basis of position information of the objective lens 104 at the time the seek was started, to bring the objective lens 104 directly back to the position where it was when the seek was started.

This enables automatic adjustment on the position of the objective lens 104 in the carriage 101 during the seek operation, accurately back to the position where the objective lens was when the seek operation was started. Thus, the relative speed of the objective lens 104 to the carriage 101 becomes zero, and it becomes possible to control minute vibration of the objective lens 104 during the seek operation stably and accurately.

Next, a seek control by the seek controller according to the first embodiment will be described, with reference to the flowchart in FIG. 4.

The flowchart in the figure shows a process procedure covering a shift from a tracking control to a seek control, until the seek operation is finished.

First, in the tracking control, the average calculator 801 calculates an average value C1 of a driving current (the electric current supplied to the electric magnets 105c, 105d) in the lens actuator 105 for each rotation of the optical disc 2. The calculated value C1 is stored in the memory 802 (a loop S1-S4). The storage is made by overwriting a previously calculated value with a newly calculated value C1.

When a seek operation command comes from the system controller 5 during the tracking control (S4: YES), first, the calculated value C1 (position information of the objective lens 104 in the carriage 101 right before starting the seek operation) stored in the memory 802 is stored in the memory 807 as an initial value (S5).

Subsequently, the speed error calculator 805 calculates a traveling speed V of the carriage 101 (S6) from a target number of revolutions N which is a value inputted to the carriage actuator 102. Meanwhile, the speed calculator 804 calculates a traveling speed VA of the objective lens 104 (S7) based on a TES signal. Then, the speed error calculator 805 calculates a speed error ΔV(=VA−V) between the traveling speed V of the carriage 101 and the traveling speed VA of the objective lens 104 (S8), and the traveling speed of the objective lens 104 is controlled so that the speed error ΔV becomes zero (S9) In other words, a relative speed ΔV of the objective lens 104 to the carriage 101 is calculated (S8), and the traveling speed of the objective lens 104 is controlled so that this relative speed ΔV becomes zero (S9).

This cycle of the steps S6-S9 is repeated during each rotation of the optical disc 2 (a loop of S6-S10, S14 and S6). At each end of one complete rotation of the optical disc 2 (S10: YES), calculation is made for an average value C2 of the speed error ΔV (position information of the current objective lens 104 in the carriage 101) outputted from the speed error calculator, and this calculated value C2 overwrites the old value in the memory 2 (S11).

Then, the speed error ΔV average value C2 is compared to the average value C1 in the memory 802 to obtain an error ΔC=|C1−C2|, and the system determines if the error ΔC exceeds a predetermined threshold value Cs (S12). It should be noted that the process in Step S12 in this flowchart is a process with the speed error ΔV, which is equivalent to the method described earlier; i.e. calculating an amount of positional displacement ΔX of the objective lens 104 in the carriage 101 to see if this positional displacement ΔX exceeds a predetermined threshold Xr.

If the error ΔC is greater than the threshold value Cs (S12: YES), the process brings the driving current to the lens actuator 105 back to the state right before the seek was started (S13). In other words, the objective lens 104 is brought back to the position where it was in the carriage 101 right before the seek was started. Subsequently, the process checks to see if the seek operation is finished (S14). If the seek operation is not finished yet (S14: NO), the process goes back to Step S6 and repeats the above-described seek control (a loop from S6-S14 to S6).

On the other hand, if the error AC is not greater than the threshold value Cs (S12: NO), the process skips Step S13, goes to Step S14 and checks if the seek operation is finished. If the seek operation is not finished (S14: NO), the process goes back to Step S6 and repeats the above-described seek control (a loop of S6-S12, S14 and then to S6). If the seek operation is finished (S14: YES) the seek control process comes to an end.

As described above, according to the seek control performed by the optical disc drive offered by the first embodiment, the drive stores position information of the objective lens 104 in the carriage 101 at the time when a seek control is started. Then, during the seek operation, the drive calculates the position of the objective lens 104 in the carriage 101, and corrects the position of the objective lens 104 in the carriage 101 back to the initial position where it was at the time when the seek control is started if the position during the seek operation is away from the initial position by an amount equal to or greater than a single track interval on the optical disc 2. With this arrangement, even when the TES signal includes a non-detection error of the track crossing, it is possible to accurately zero the relative speed of the objective lens 104 with respect to the carriage 101 and thereby suppress minute vibration which will otherwise develop in the objective lens 104.

Therefore, it becomes possible to reliably move from rough seek control to precise seek control as quickly as possible, enabling a quick and accurate seek control of the optical head 10.

Figure 5:
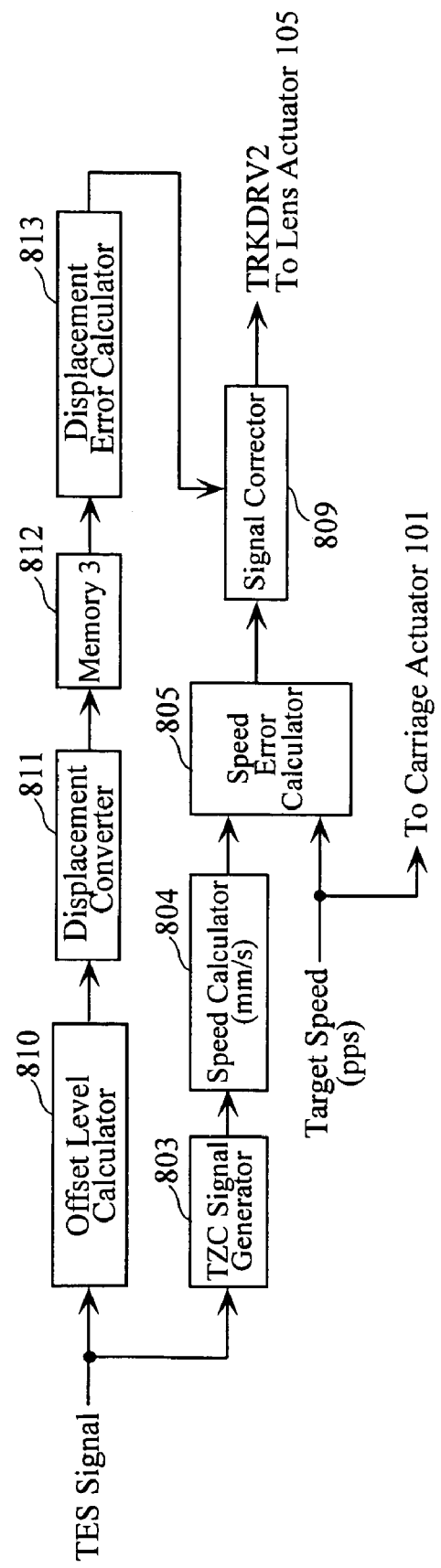
FIG. 5 is a block diagram showing a second embodiment of the seek operation control in a seek controller.

FIG. 5 is a block diagram showing a second embodiment of the seek operation control by a seek controller 8.

In the first embodiment, the position of the objective lens 104 in the carriage 101 is calculated from the amount of electric current applied to the electric magnets 105c, 105d of the lens actuator 105. In the second embodiment, the position of the objective lens 104 in the carriage 101 is calculated from an offset level of the TES signal which is a signal having a sine-wave form. (The offset level is a signal level representing a center axis of the signal amplitude change pattern, and is essentially equal to an average value of the positive-side peak value and the negative-side peak value.) The offset level corresponds to the position of objective lens 104 in the carriage 101.

Figure 6:
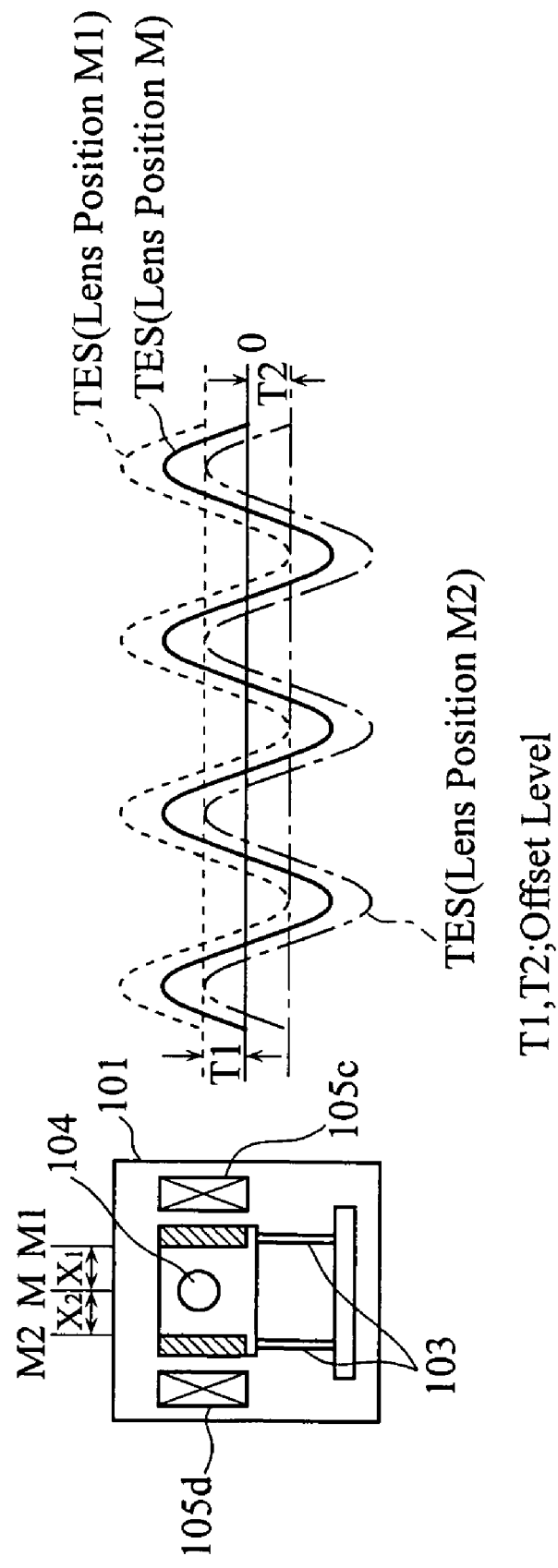
FIG. 6 illustrates a relationship between an amount of lens dislocation and an amount of offset in a TES signal.

Specifically, refer to FIG. 6 and assume that the objective lens 104 is at the reference position M of the carriage 101 when a seek operation of the carriage 101 is performed. In this case, the TES signal outputted from the optical head 10 has a center axis of the sine-wave amplitude change pattern at a value of 0, and so the offset level is 0. (FIG. 6: See the waveform indicated in a solid line.)

On the other hand, when the objective lens 104 is dislocated from the reference position M of the carriage 101 by +X1 at the time of a seek operation of the carriage 101, the TES signal outputted from the optical head 10 has a center axis of the sine-wave amplitude change pattern at a value of T1 (>0), and so an offset level is T1. (FIG. 6: See the waveform indicated in a broken line.) Likewise, when the objective lens 104 is dislocated from the reference position M of the carriage 101 by −X2 at the time of a seek operation of the carriage 101, the TES signal outputted from the optical head 10 has a center axis of the sine-wave amplitude change pattern at a value of T2 (0<), and so an offset level is T2. (FIG. 6: See the waveform indicated in a phantom line.)

As described, the TES signal offset level T represents the position of the objective lens 104 in the carriage 101 (amount of displacement from the reference position M). Based on this, the second embodiment obtains the offset level T from the TES signal outputted from the optical head 10, and calculates the position of objective lens 104 in the carriage 101 (amount of displacement from the reference position M) from the offset level T.

Thus, FIG. 5 shows a block diagram which is similar to the block diagram in FIG. 3, differing in that the average-value calculator 801, the memory 802, the average-value calculator 806, the memory 807 and the error calculator 808 are replaced by an offset level calculator 810, a displacement-amount converter 811, a memory 812 and a displacement-amount determiner 813.

In FIG. 5, the offset level calculator 810 calculates the offset level T from the TES signal outputted from the optical head 10. The offset level calculator 810 detects, for example, a maximum value Vmax and a minimum value Vmin of the TES signal, and calculates an average value of the two; Vave= (Vmax+Vmin)/2, thereby obtaining the offset level T.

The displacement-amount calculator 811 calculates the position of the objective lens 104 in the carriage 101 (deflected position from the reference position M) from the TES signal offset level T which is calculated by the offset level calculator 810 at a predetermined interval. The memory 812 stores position information of the objective lens 104 in the carriage 101 calculated by the displacement-amount calculator 811.

The displacement-amount calculator 811 has a table which shows a relationship between the offset level T and the deflected position X from the reference position M, and converts the TES signal offset level T calculated by the offset level calculator 810 into the position of the objective lens 104 in the carriage 101 using the table. The position information of the objective lens 104 is overwritten in the memory 812 each time the information is obtained.

The displacement-amount determiner 813 determines if the position of the objective lens 104 stored in the memory 812 exceeds a predetermined threshold which is set for the initial position of the objective lens 104 at the time the seek was started. Specifically, the displacement-amount determiner 813 checks if the positional displacement amount ΔX of the objective lens 104 in the carriage 101 from the initial position at the time when the seek started is greater than a predetermined threshold Xr.

Then, if the error ΔX exceeds the threshold value Xr, the displacement-amount determiner 813 determines that the TES signal includes a track-crossing non-detection error which will lead to improper control on the position of the objective lens 104 and thus, sends a correction signal of the drive signal TRKDRV2 to the signal corrector 809.

The TZC signal generator 803 through the speed error calculator 805 as well as the signal corrector 809 work exactly the same as in the first embodiment, so the details will not be repeated here.

Figure 7:
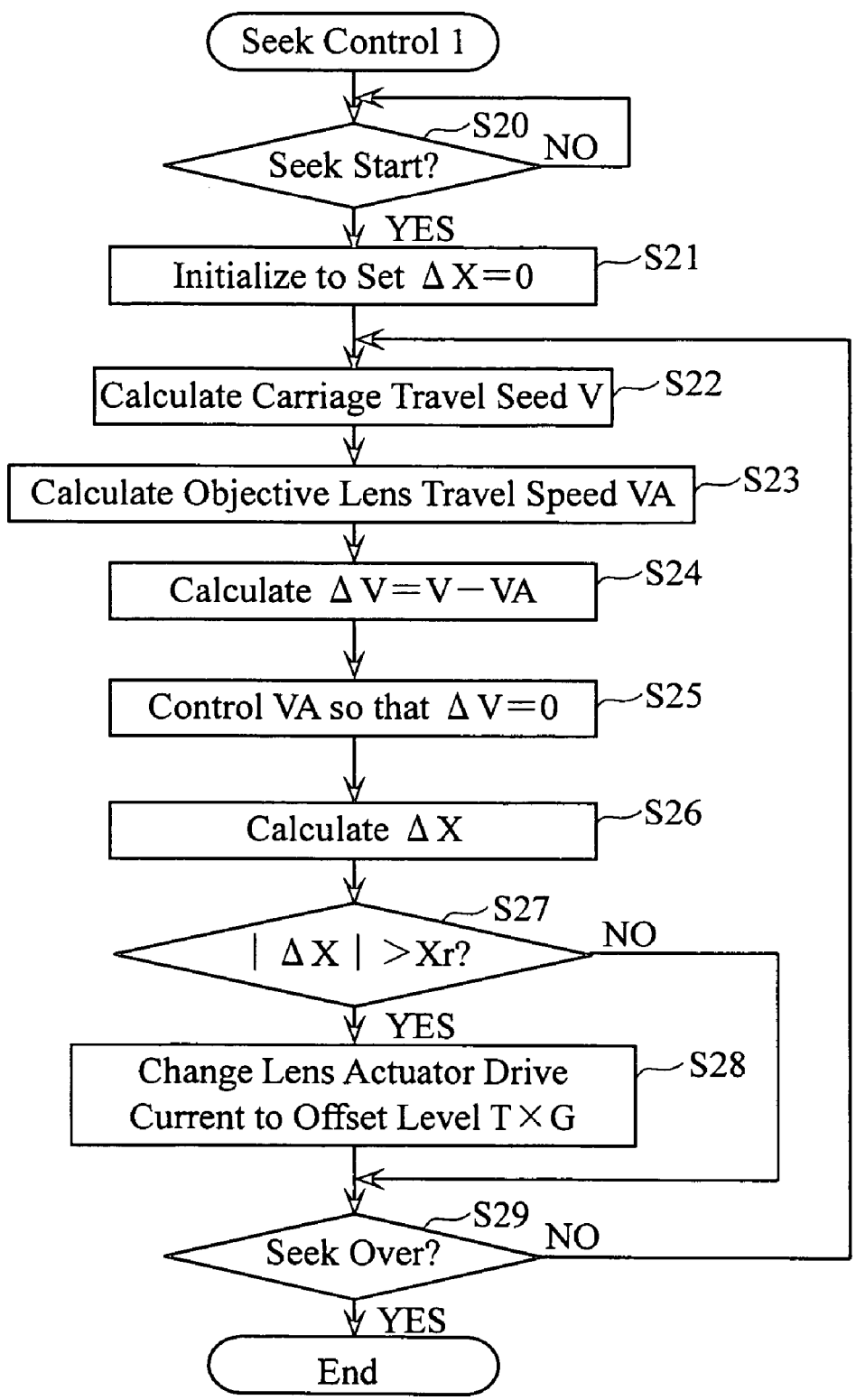
FIG. 7 is a flowchart showing a seek control procedure according to a third embodiment.

Next, a seek control by the seek controller according to the second embodiment will be described, with reference to the flowchart in FIG. 7.

Again, the flowchart shown in the figure covers a process procedure from a tracking control to a seek control, until the seek operation is finished.

When a seek operations command comes from the system controller 5 during tracking control (S20: YES), first, an initial value "0" is stored in the memory 812, as the amount of positional displacement of the objective lens 104 in the carriage 101. Specifically, the position of the objective lens 104 in the carriage 101 when the seek operation started is used as the baseline to see the displacement.

Subsequently, the speed error calculator 805 calculates a traveling speed V of the carriage 101 from a target number of rotation N which is inputted to the carriage actuator 102 (S22). Meanwhile, the speed calculator 804 calculates a traveling speed XA of the objective lens 104 based on the TES signal (S23). Subsequently, the speed error calculator 805 calculates a speed error $\Delta V (=VA-V)$ between the traveling speed V of the carriage 101 and the traveling speed VA of the objective lens 104 (S24) and further, the traveling speed of the objective lens 104 is controlled so that the speed error $\Delta V$ becomes zero (S25). Specifically, a relative speed $\Delta V$ of the objective lens 104 with respect to the carriage 101 is calculated (S24), and the traveling speed of the objective lens 104 is controlled so as to zero the relative speed $\Delta V$ (S25).

Subsequently, the offset level calculator 810 calculates the TES signal offset level T. Then, from this offset level T, the displacement-amount converter 811 calculates a displacement amount $\Delta X$ of the objective lens 104 in the carriage 101, and these values are stored in the memory 812 (S26).

Next, determination is made to see if the displacement amount $|\Delta X|$ is greater than a predetermined threshold Xr (e.g. a distance equal to the track interval in the optical disc 2) (S27). If the displacement amount $|\Delta X|$ is greater than the predetermined threshold Xr (S27: TES), correction is made to a drive signal TRKDRV1 which is to be inputted to the lens actuator 105, based on an offset level T which represents the displacement amount $\Delta X$ (S28). Specifically, the signal corrector 809 multiplies the offset level T with a predetermined coefficient G to obtain a drive signal TRKDRV2, and supplies this drive signal TRKDRV2 to the lens actuator 105, thereby adjusting the position of objective lens 104 in the carriage 101 back to the position where it was right before the seek operation was started.

Then, the process checks to see if the seek operation is finished (S29). If the seek operation is not yet finished (S29: NO), the process goes back to Step S22, and repeats the above-described seek control (a loop of S22-S29 and S22).

On the other hand, if the displacement amount $|\Delta X|$ is not greater than the threshold value Xr (S27: NO), the process skips Step S28, and goes to Step S29 to check if the seek operation is finished. If the seek operation is not yet finished (S29: NO), the process goes back to Step S22 and repeats the above-described seek control (a loop of S22-S27, S29 and then to S22). If the seek operation is finished (S29: YES), seek control process comes to an end.

Alternatively, Step S27 may compare the offset level T to a predetermine threshold Tr, to determined if the displacement amount $|\Delta X|$ is greater than the predetermined threshold Xr.

As described above, the seek control performed by the optical disc drive according to the second embodiment functions similarly to that of the optical disc drive according to the second embodiment; i.e. the drive calculates the position of the objective the lens 104 in the carriage 101 during seek operation, and corrects the position of objective lens 104 in the carriage 101 back to the initial position where it was at the time when the seek control is started if the position is away from the initial position by an amount equal to or greater than a single track interval on the optical disc 2. With this arrangement, even when the TES signal includes a non-detection error of the track crossing, it is possible to accurately zero the relative speed of the objective lens 104 with respect to the carriage 101, and thereby suppress minute vibration which will otherwise develop in the objective lens 104.

Figure 8:
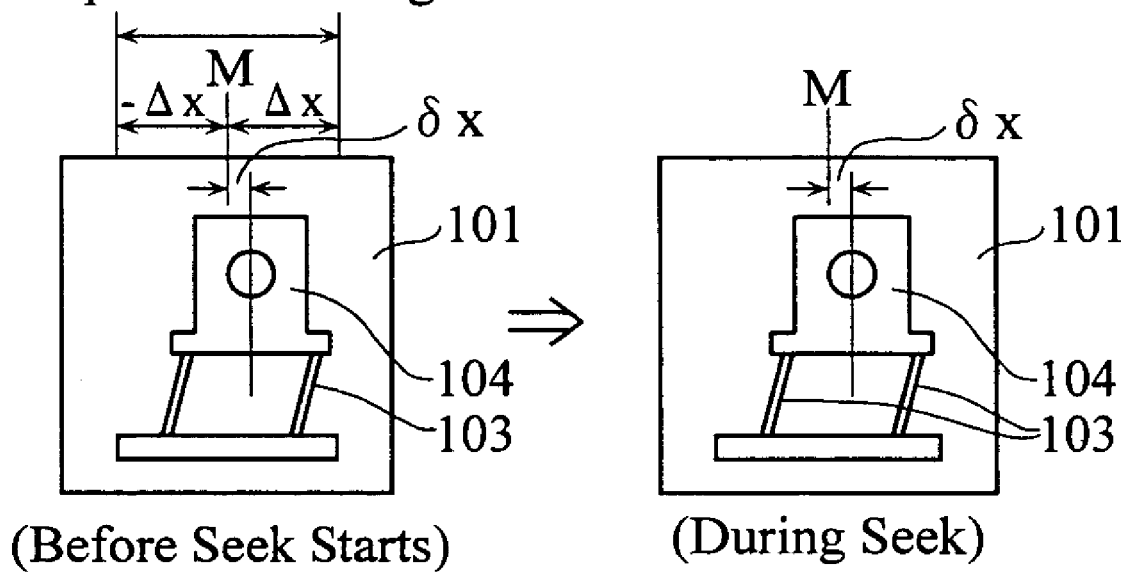
FIG. 8 is a flowchart showing a seek control procedure according to the second embodiment.

Now, in both of the first and the second embodiments, if the position of objective lens 104 in the carriage 101 is deflected from the reference position M at the beginning of seek operation, the process controls the position of the objective lens 104 so that the displacement is maintained during the seek operation. Specifically, refer to FIG. 8 which shows a situation in which the position of the objective lens 104 in the carriage 101 right before the seek operation started is away from the reference position M by an amount+$\delta x$, for example. In this case, the position control of the objective lens 104 in the carriage 101 during this seek operation will be made using the deflected initial position as the center point, i.e. the center point is the position away from the reference position M by +$\delta x$.

In this example, assume that the control process sets a displacement range which spans by an amount +$\Delta x$ and an amount −$\Delta$ from the reference position M, for the position control of the objective lens 104. With the center of position control for the objective lens 104 being shifted by +$\delta x$, the displacement range usable for the position control as measured from the center point spans to +($\Delta x$−$\delta x$) and to −($\Delta x$+$\delta x$). In other words, the displacement range is smaller on the positive side by the amount $\delta x$. This will not affect the position control on the objective lens 104 as long as the displacement amount $\delta x$ is small. But if the displacement amount $\delta x$ is relatively large, such as an amount closer to either end of the displacement range, the position control on the objective lens 104 during the seek operation will be difficult. For this reason, it is preferable that the position of the objective lens 104 in the carriage 101 right before the seek operation begins be on the reference position M as much as possible.

Thus, in the seek control according to the first and the second embodiments, the following operation should be made if the position of the objective lens 104 in the carriage 101 calculated right before a seek operation started was deflected away from the reference position M: Specifically, right after the seek operation has begun, only the objective lens 104 is moved in the seek operation, and once the objective lens 104 has moved onto the reference position M in this seek operation, then the seek operation by the carriage 101 is started as described earlier.

Figure 9:
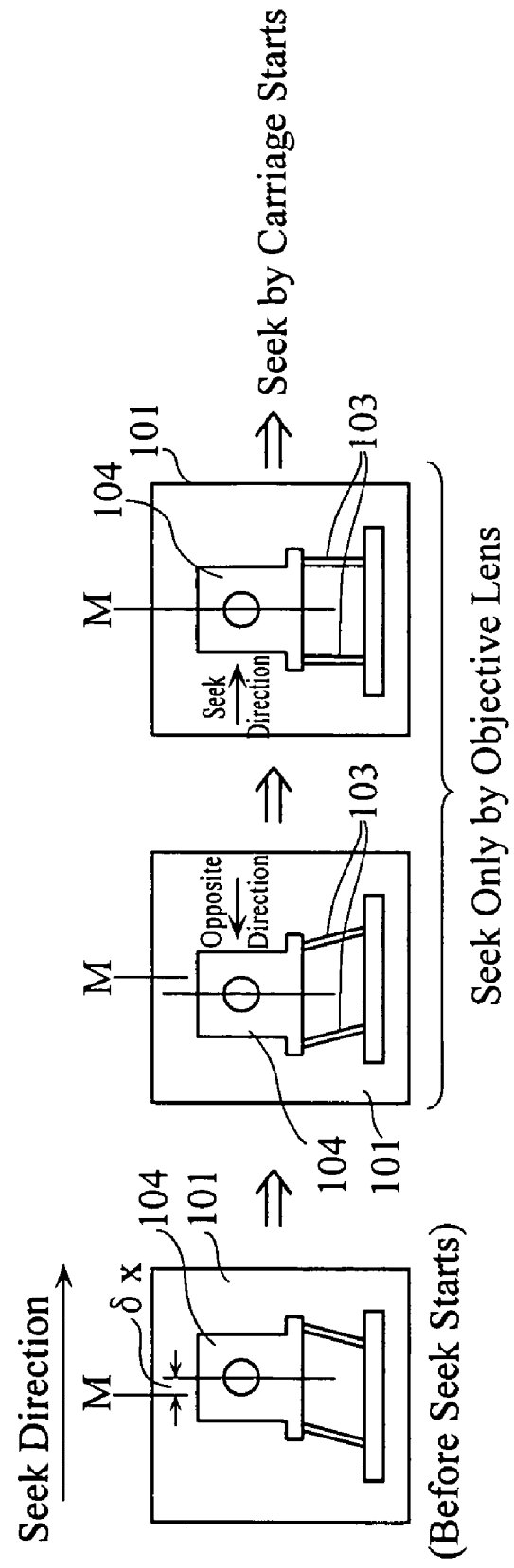
FIG. 9 is a diagram for describing how the objective lens is returned to a reference position after a dislocation from the reference position in a seek direction.

More specifically, take a case shown in FIG. 9 where the position of objective lens 104 in the carriage 101 calculated right before a seek operation was started had a displacement away from the reference position M by an amount+$\delta x$ in the direction of seek operation. In this case, right after the seek operation has been started, the objective lens 104 is moved from the reference position M in the negative direction by a predetermined amount. Thereafter, only the objective lens 104 is moved to set the beam spot traveling speed VA to a target speed V. Once the objective lens 104 moves in the positive direction (direction of the seek operation) and has reached the reference position M in this speed control operation, the process switches to a seek operation by the carriage

101. Thereafter, the position of the objective lens 104 with respect to the carriage 101 is maintained at the reference position M.

Figure 10:
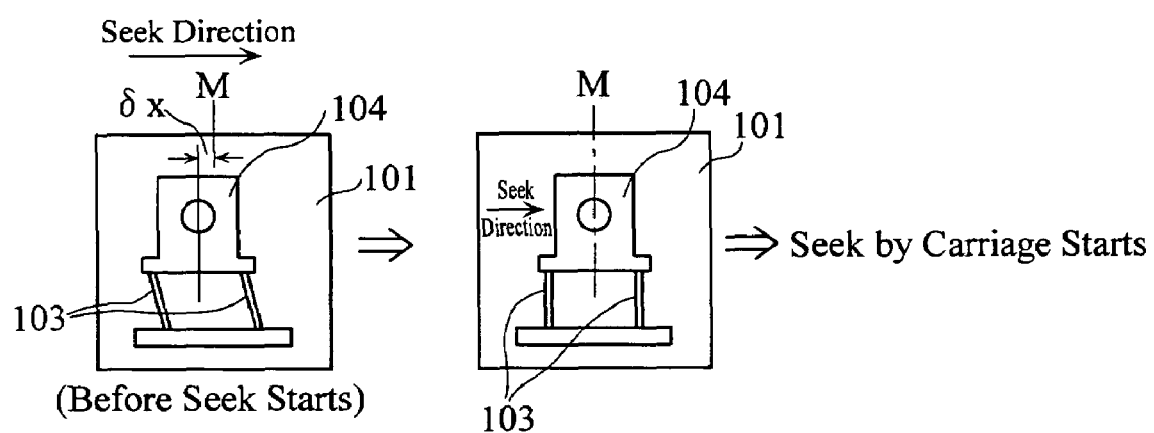
FIG. 10 is a diagram for describing how the objective lens is returned to the reference position after a dislocation from the reference position in a direction opposite to the seek direction.

Conversely, take a case in FIG. 10 where the position of the objective lens 104 in the carriage 101 calculated right before a seek operation was started had a displacement away from the reference position M by an amount −δx in the opposite direction of the seek operation. In this case, only the objective lens 104 is moved right after the seek operation has been started, to set the beam spot traveling speed VA to a target speed V. Once the objective lens 104 moves in the positive direction (direction of the seek operation) and has reached the reference position M in this speed control operation, the process switches to a seek operation by the carriage 101. Thereafter, the position of the objective lens 104 with respect to the carriage 101 is maintained at the reference position M.

Figure 11:
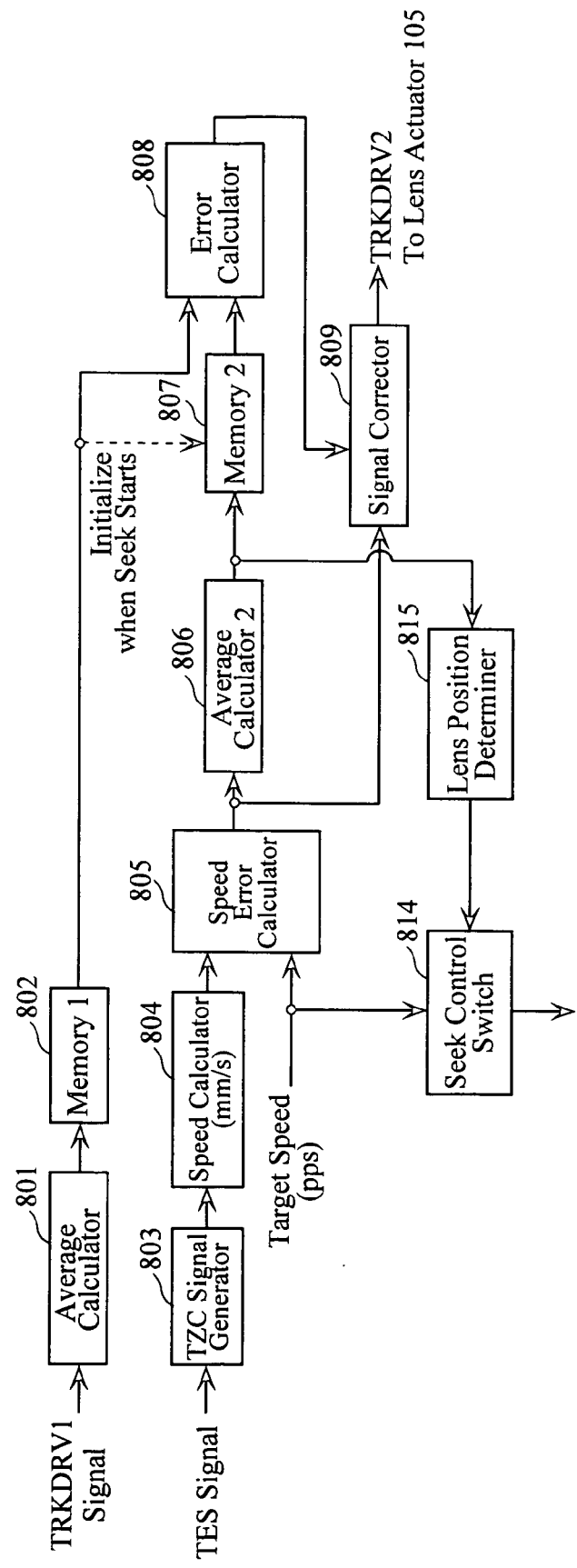
FIG. 11 is a block diagram showing the third embodiment of the seek operation control in a seek controller.

FIG. 11 is a block diagram showing a third embodiment of the seek operation control in the seek controller.

In the third embodiment, right after a seek operation is started, only the objective lens 104 is moved in this seek operation to adjust the objective lens 104 back into the reference position M in the carriage 101 and thereafter, the seek control according to the first embodiment follows.

FIG. 11 shows a block diagram, which is the block diagram in FIG. 2 further including a seek control switcher 814 and a lens position determiner 815.

The lens position determiner 815 determines whether the objective lens 104 is at the reference position M, from position information about the current position of objective lens 104 in the carriage 101 outputted from the average-value calculator 806. When the position of the objective lens 104 in the carriage 101 is the reference position M, the lens position determiner 815 outputs a switching signal to the seek control switcher 814. Upon reception of the switching signal from the lens position determiner 815 the seek control switcher 814 outputs a target speed signal to the carriage actuator 102, having the carriage actuator 102 perform a seek operation by the carriage 101.

With this arrangement, if the position of the objective lens 104 in the carriage 101 at the time when a seek operation started is not the reference position M, the target speed signal is not outputted to the carriage actuator 102, so a seek operation by the carriage 101 is not performed and thus a seek operation by only moving the objective lens 104 is performed. Then, when the position of the objective lens 104 in the carriage 101 has moved to the reference position M during this seek operation, a target speed signal is outputted to the carriage actuator 102, whereupon a seek operation by the carriage 101 is started.

Figure 12:
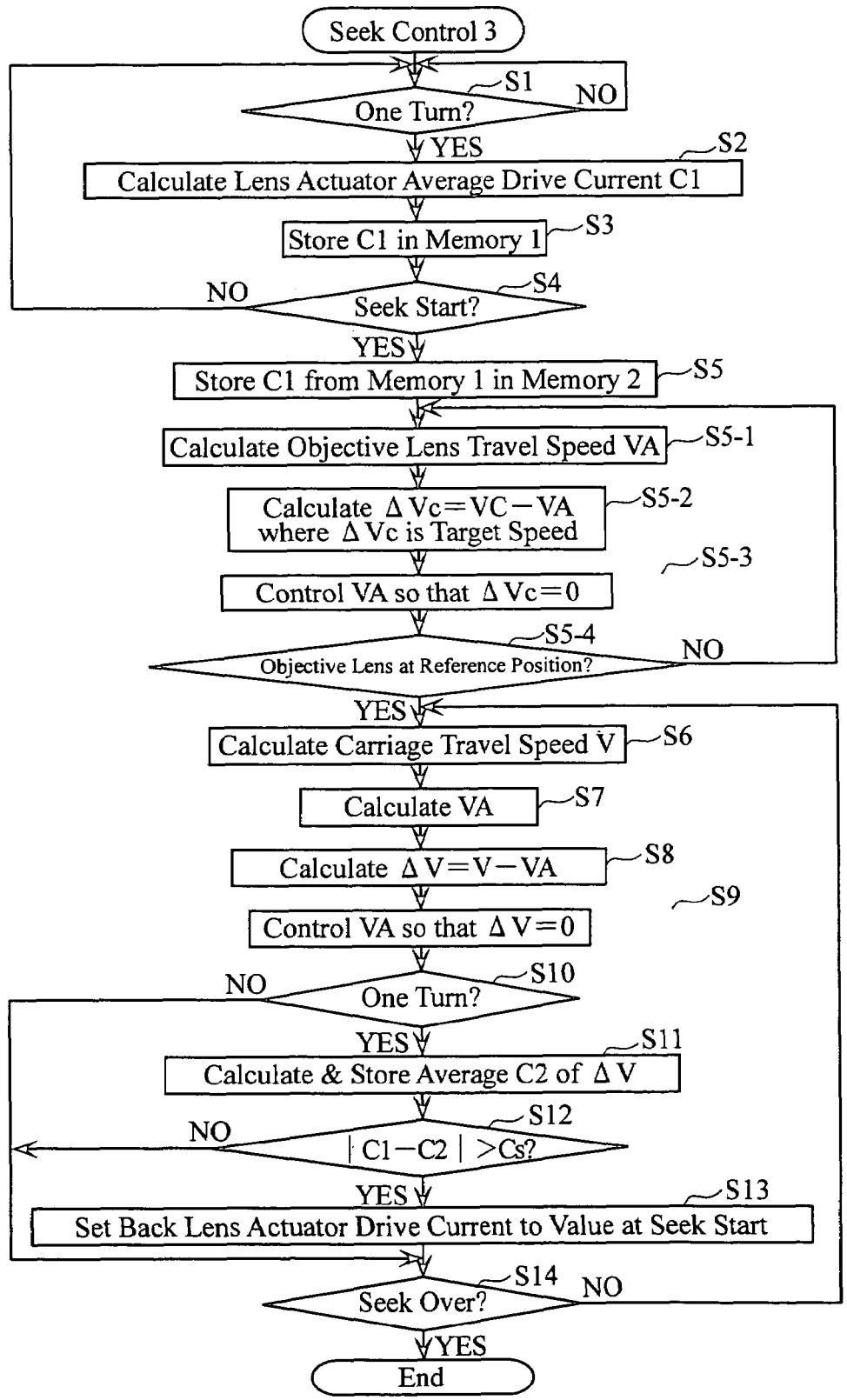
FIG. 12 is a flowchart showing a seek control procedure according to the third embodiment.

FIG. 12 is a flowchart showing a seek control procedure according to the third embodiment.

Figure 4:
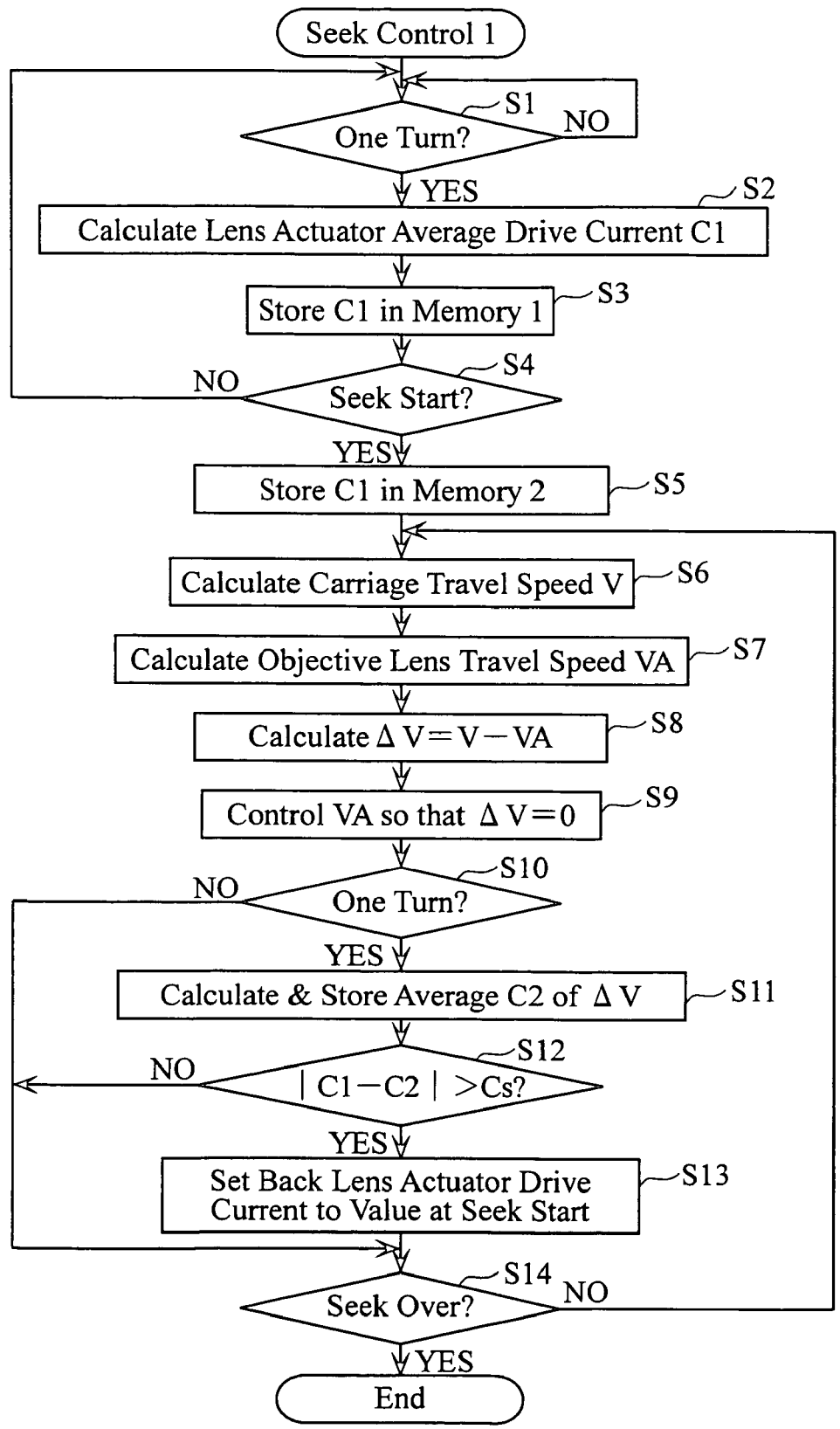
FIG. 4 is a flowchart showing a seek control procedure according to the first embodiment.

The flowchart in the figure is the one shown in FIG. 4 which further includes a routine indicated by Step S5-1 through Step S5-4 (a seek operation procedure by the objective lens 104 only) between Step S5 and Step S6.

The flowchart is the same as the flowchart in FIG. 4, differing only by Step S5-1 through Step S5-4, so the following description will cover only the added portion, i.e. Step S5-1 through Step S5-4 as a supplement.

When a seek operation command comes from the system controller 5 during a tracking control (S4: YES), first, a calculated value C1 (position information of the objective lens 104 in the carriage 101 right before starting the seek operation) stored in the memory 802 is stored in the memory 807 as an initial value (S5).

Subsequently, the speed calculator 804 calculates a traveling speed VA of the objective lens 104 based on the TES signal (S5-1). Further, the speed error calculator 805 calculates a speed error ΔVc=VC−VA between the traveling speed VA and a target traveling speed VC of the objective lens 104 which is the object of the control (S5-2).

Then, control is performed on the movement of the objective lens 104 so that the speed error ΔVc becomes zero (SS-3), and lens position determiner 815 checks if this movement control has brought the objective lens 104 onto the reference position M (S5-4).

If the objective lens 104 is not at the reference position M (S5-4: NO), the process goes back to Step S5-1 to continue the seek operation only by the objective lens 104 (a loop from S5-1 to S5-4). Once the objective lens 104 comes to the reference position M (S5-4: YES), the process moves to Step S6, where the seek controller 814 switches to a seek operation using the carriage 101 according to the first embodiment.

Figure 13:
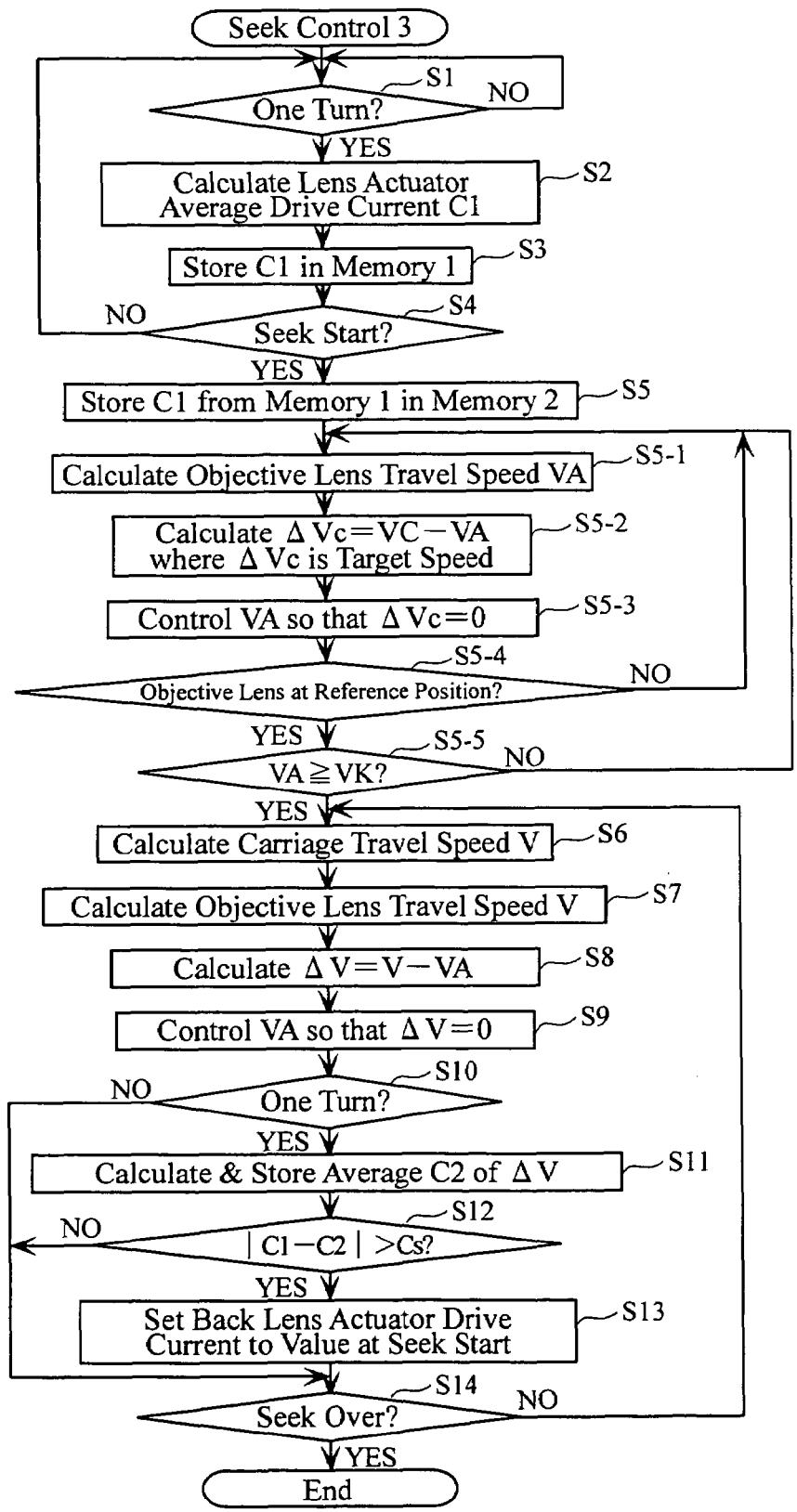
FIG. 13 is a flowchart showing a seek control procedure according to a fourth embodiment.

FIG. 13 is a flowchart which shows an improved version of the seek control according to the third embodiment.

Specifically, the flowchart in FIG. 13 is the one shown in FIG. 12 which further includes Step S5-5 (determination if the traveling speed VA of the objective lens 104 has come up to a predetermined traveling speed VK), between Step S5-4 and Step S6.

In the seek control according to the first and the second embodiments, an initial target value Vo for the traveling speed of the carriage 101 is set to 400 (pps) and quick acceleration is made upon starting of a seek operation. Likewise, in the seek control according to the third embodiment, the seek operation is started at an initial target value Vo of 400 (pps) for the traveling speed of the carriage 101 upon switching from a seek operation by only the objective lens 104 to a seek operation by moving the carriage 101.

In this arrangement therefore, if the traveling speed VA of the objective lens 104 has not yet reached an equivalent of the initial target value Vo for the carriage 101 upon switching of the seek operations, there will be an abrupt change in the traveling speed of the objective lens 104, which can cause minute vibration in the objective lens 104.

Figure 14:
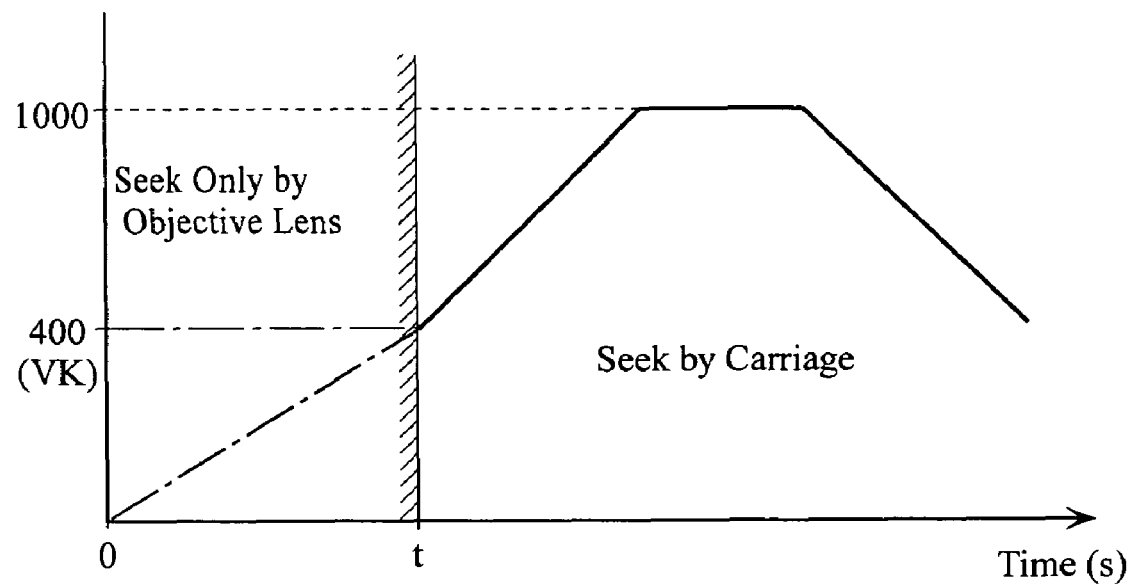
FIG. 14 shows a profile of a target speed of the carriage and objective lens in a seek control according to the fourth embodiment.

Thus, another seek control is offered as summarized in a flowchart in FIG. 13 (hereinafter called seek control according to a fourth embodiment). FIG. 14 shows this seek control, where a seek operation only by moving the objective lens 104 is continued until the traveling speed VA of the objective lens 104 attains a predetermined speed VK (an equivalent of the initial target value Vo for the carriage 101, i.e. 400 (pps) according to the present embodiment). Thereafter, switching is made to a seek operation by the carriage 101.

Specifically, according to the flowchart in FIG. 13, if Step S5-4 finds that the objective lens 104 is at the reference position M (S5-4: YES), the process further makes a check if the traveling speed VA of the objective lens 104 has reached a predetermined speed VK (e.g. an equivalent to 400 (pps)) (S5-5). If the traveling speed VA is smaller than the predetermined speed VK (S5-5: NO), the process goes back to Step S5-1, to continue the seek operation by moving only the objective lens 104 (a loop from S5-1 to S5-5). Once the traveling speed VA has reached or exceeded the predetermined speed VK (S5-5: YES), the process moves to Step S6, to switch to the seek operation according to the first embodiment which uses the carriage 101.

As has been described, according to the optical disc drives offered by the third embodiment, issuance of a seek operation command is followed by a seek operation by moving only the objective lens 104. Since this seek operation brings the objective lens 104 onto the reference position M in the carriage 101, it is possible to control minute vibration which may develop in the objective lens 104 during the seek operation stably and accurately even after switching to a seek operation by moving the carriage 101.

Further, according to the optical disc drives offered by the fourth embodiment, the switching from the seek operation by moving only the objective lens 104 to the seek operation by moving the carriage 101 is made after the traveling speed VA of the objective lens 104 has increased up to the initial speed VK of the seek operation by the carriage 101. Thus, the switching of the seek operations will not cause minute vibration in the objective lens 104, enabling to control the minute vibration which might develop in the objective lens 104 during the seek movement more stably and accurately.

According to the embodiments described above, position information of the objective lens 104 in the carriage 101 right before a seek operation starts or during a seek operation is calculated by using e.g. an average value of the electric current applied to the lens actuator 105 and an average value of the TES signal offset level T, per rotation of the optical disc 2. Alternatively however, the position information of the objective lens 104 may be calculated by using an average value per two or more rotations of the optical disc 2. In other words, position information of the objective lens 104 in the carriage 101 may be calculated at a time interval given by an integral multiple of the amount of time necessary for the optical disc 2 to make one complete turn.

It should be noted also that the use of an average value is in consideration of eccentricity of the optical disc 2 which leads to fluctuation of the electric current applied to the lens actuator 105 and fluctuation in the TES signal offset level T. Therefore, if the optical disc 2 has an eccentricity which is small enough to limit the fluctuation of the electric current applied to the lens actuator 105 and the fluctuation in the TES signal offset level T within an acceptable tolerance range, then the average value may not be calculated, and the position information of the objective lens 104 may be calculated by using an amount of electric current applied to the actuator 105 or an instantaneous value of the TES signal offset level T. In these cases, the position information of the objective lens 104 in the carriage 101 may be calculated at any appropriate time interval.

The invention claimed is:

1. An optical disc drive comprising:
   a carriage faced to a surface of an optical disc movably in a radial direction of the disc;
   a first actuator for driving the carriage;
   a light source for generating a laser beam;
   an objective lens supported on the carriage movably in radial directions of the disc for formation and placement of a beam spot formed from the laser beam generated by the light source onto the optical disc for recording or reproducing information on a plurality of centric or spiral tracks in the optical disc;
   a second actuator for moving the objective lens;
   a first signal generator for generating, upon a crossing movement by the beam spot over the track in the optical disc, a first signal based on a reflected beam from the optical disc and having a sine-wave amplitude pattern representing the crossing movement of the beam spot over the track;
   a second signal generator for generating a second signal based on an amplitude change of the first signal generated by the first signal generator, as a square wave signal reversing its level upon each crossing movement of the beam spot over the track;
   a first speed calculator for calculating a traveling speed of the carriage during a seek operation by the carriage;
   a second speed calculator for calculating a traveling speed of the objective lens based on the second signal during the seek operation by the carriage;
   a controller for controlling the second actuator for a movement of the objective lens at a relative traveling speed of zero with respect to the carriage, based on the traveling speed of the carriage and the traveling speed of the objective lens calculated by the first and the second speed calculator;
   wherein the optical disc drive further comprises:
   a first position detector for detecting position information of the objective lens in the carriage right before starting of the seek operation by the carriage;
   a memory for storing the position information of the objective lens detected by the first position detector;
   a second position detector for detecting position information of the objective lens in the carriage at a predetermined time interval during the seek operation by the carriage; and
   a position corrector for comparing the position information detected by the second position detector to the position information stored in the memory, and for correcting a position of the objective lens in the carriage to a position indicated by the information stored in the memory upon an error between the two pieces of position information exceeding a predetermined threshold value.

2. The optical disc drive according to claim 1, wherein an amount of movement of the objective lens is proportional to an amount of electric current consumed by the second actuator, the first and the second position detectors detecting their respective position information of the objective lens in the carriage based on the amount of electric current consumed by the second actuator.

3. The optical disc drive according to claim 1, wherein the first signal is a superimposed signal provided by an offset level signal based on an amount and direction of movement of the objective lens superimposed over the signal having a sine-wave amplitude pattern representing the crossing movement by the beam spot over the track, the first and the second position detector detecting their respective position information of the objective lens in the carriage based on the offset level in the first signal.

4. The optical disc drive according to one of claims 1 through 3, further comprising:
   a determiner for determining if the position of the objective lens in the carriage detected by the first position detector is a reference position indicating a zero amount of movement; and
   a seek controller for starting a seek operation for the beam spot by moving only the objective lens using the second actuator upon determination by the determiner of the objective lens not being at the reference position, and for starting the seek operation by the carriage upon coming of the objective lens to the reference position.

5. The optical disc drive according to claim 4, further comprising:
   a third speed calculator for calculating a traveling speed of the objective lens upon coming of the objective lens to the reference position during the seek operation by the objective lens; and
   a speed determiner for determining whether the traveling speed of the objective lens calculated by the third speed calculator exceeds a predetermined threshold;
   wherein the seek controller continues the seek operation by moving only the objective lens until the traveling speed of the objective lens calculated by the third speed calculator has attained the predetermined threshold if the traveling speed of the objective lens determined by the speed determiner is lower than the predetermined threshold.

* * * * *